June 23, 1964 A. A. LINLEY, SR 3,137,962
TROLLING SINKER
Filed March 23, 1962
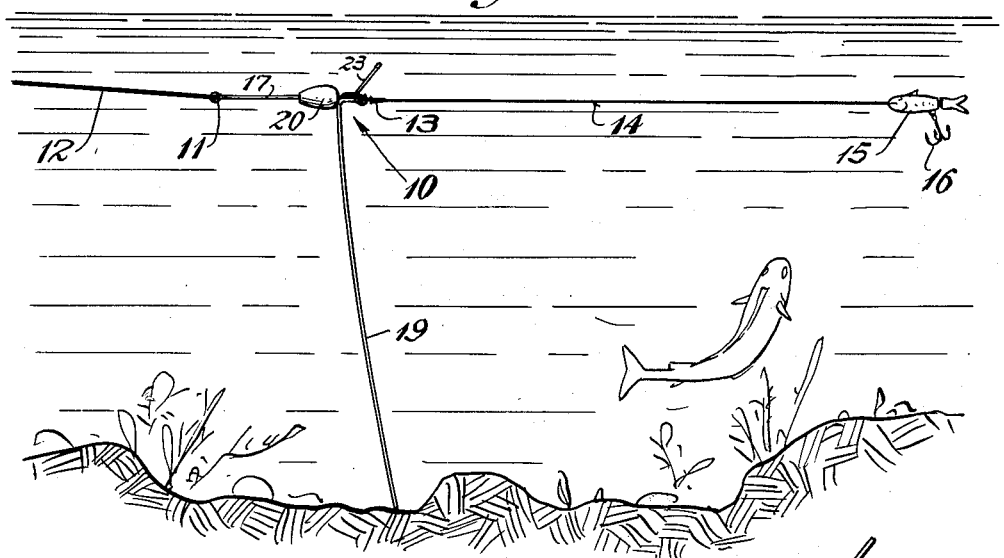
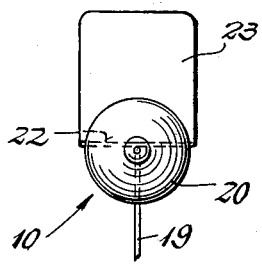
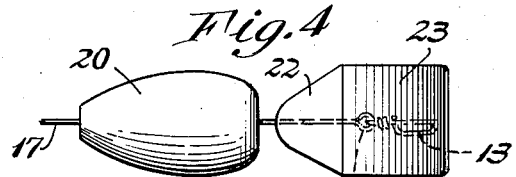
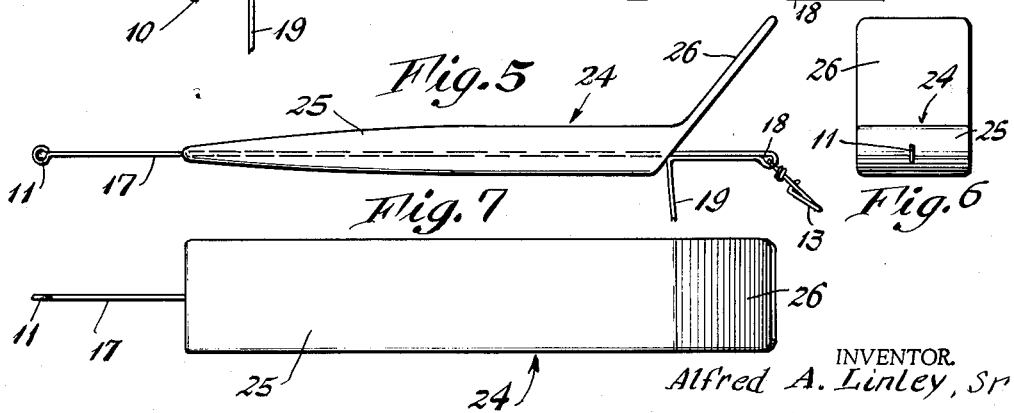
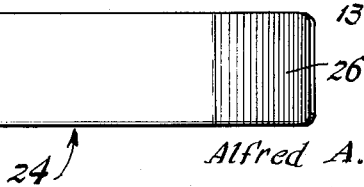
INVENTOR.
Alfred A. Linley, Sr
BY
Johnson and Kline
ATTORNEYS United States Patent Office 3,137,962
Patented June 23, 1964

3,137,962
TROLLING SINKER
Alfred A. Linley, Sr., 682 State St. Extension,
Bridgeport, Conn.
Filed Mar. 23, 1962, Ser. No. 181,990
1 Claim. (Cl. 43—43.13)

The present invention relates to fishing equipment and more particularly to a sinker that, when used in trolling, maintains the bait or lure and hook attached at a depth in the water that is a preselected height above the bottom.

As is well known, fishing by trolling consists of drawing the fish line at a low speed through the water to keep the lure or bait moving. Normally this is accomplished by using a boat carrying the fisherman and when trolling for some types of fish, it is desirable that the bait or lure be maintained at a depth in the water which is just slightly above the bottom. Heretofore the lure depth has generally been controlled by having a very heavy weight that is drawn on the bottom with the lure being secured to the sinker to be a selected distance above the sinker. The use of a heavy sinker has not been found completely satisfactory because of its tendency to snag on rocks and other objects on the bottom and with consequent loss of the sinker and lure attached thereto. Moreover, because of its weight it decreases the feel on the line when a fish accepts the bait and also erratic movement may give a false feel on the line that a fish has accepted the bait.

It is accordingly an object of the present invention to provide a sinker that, when used in trolling fishing, obviates the above disadvantages of the heavy weight sinker, yet maintains the lure and hook a preselected distance above the bottom of the water.

Another object of the present invention is to provide a trolling sinker of the above type which is buoyant yet when drawn through the water above a minute minimum speed is forced to its preselected depth and maintained at this depth even with substantial variations in speed.

A further object of the present invention is to provide a trolling sinker that maintains its preselected depth even when drawn in a curving path and has no tendency to roll or rotate.

Another object of the present invention is to provide a trolling sinker that achieves the above-noted objects and yet is economical to manufacture and durable in use.

In carrying out the present invention there is provided a trolling sinker that has a body which is formed from buoyant material and/or is sufficiently hollow to be buoyant. At one end is provided means such as an eye to which is secured the fish line while at its other end there are means, such as a snap hook, to which the lure or bait and hook are securable. Also at its other end there is provided at least one fin which, as herein shown, is an upwardly inclined flat plate which by reason of its shape and direction effects a downward force on the sinker as it is drawn through the water. A small diameter rod depends downwardly from the body and its length is substantially the selected height above the bottom at which the sinker is maintained because the free end of the rod engages the bottom. The rod is preferably of small though constant diameter and hence has little if any tendency to snag.

In use, with no movement the sinker floats as the body has sufficient buoyancy too vercome the weight of the rod and fin. Upon movement through the water, the fin exerts a downward force which causes the sinker to sink to a depth at which the free end of the rod engages the bottom and as the sinker is kept moving, the downward force of the fin keeps the free end in engagement with the bottom, thereby spacing the body the selected height above the bottom. The rod, by being made of metal and depending downwardly from the buoyant body, inhibits any rolling action of the sinker. Moreover, the body is maintained substantially horizontal as it is drawn through the water by the relative proportioning between the area and inclination of the fin, the place of securement and weight of the rod to the body and the horizontal distance from the fin and rod where the fish line is secured.

Other features and advantages will hereinafter appear.

In the drawing:

FIGURE 1 is a view of the trolling sinker of the present invention being used and drawn through the water and showing a side view of the sinker.

FIG. 2 is a longitudinal sectional view of the sinker shown in FIG. 1.

FIG. 3 is a front view of the sinker shown in FIGS. 1 and 2.

FIG. 4 is a plan of the sinker of FIGS. 1–3 inclusive.

FIG. 5 is a side view of a further embodiment of the trolling sinker of the present invention.

FIGS. 6 and 7 are a front view and a plan respectively of the embodiment of the sinker shown in FIG. 5.

Referring to the drawing, FIG. 1, the trolling sinker of the present invention is generally indicated by the reference numeral 10 and at its forward end is provided with means, specifically shown as an eye 11, to which an end of a fishing line 12 is secured. At the other, a rearward end of the body, is means, specifically shown as a snap hook 13, to which is secured a line 14 to which is attached a lure 15 carrying a fish hook 16, though if desired a baited hook may be otherwise used.

The fish line securing means 11 is formed at one end of a slender bar 17 (FIG. 2) which has its rearward end reversely bent to form an eye 18 to which the means 13 is secured. The bar 17 is then bent to extend substantially vertically downward to form a depending rod 19. A body 20 is secured on the bar 17 between the two means 11 and 13. The body 20, according to the present invention, is buoyant and while it may be formed of a hollow air enclosing member, it is here shown as a solid member formed of buoyant material, such as wood or light-weight plastic.

A fin 21 having a horizontal leg 22 and a substantially vertical leg 23 is fastened to the bar 17 adjacent the rearward end thereof, as by soldering or welding the leg 22 thereto to have the leg 23 extend upwardly and inclined rearwardly. The fin 21 may be formed of bendable material such as sheet metal in order that the angle between the two legs may be altered for reasons hereinafter apparent.

In the embodiment of the invention shown in FIGS. 5–7 inclusive and generally indicated by the reference numeral 24, the bar 17 and rod 19 are the same as in the previously described embodiment. However, here a body 25 has a wedge-like shape and is provided at its rearward end with an integral flat fin 26 that projects upwardly and is inclined rearwardly. This body 25, as previously described, is also sufficiently buoyant to effect floating of the sinker when still and the fin 26 is of sufficient area and at an angle that it effects sinking of the sinker 24 upon movement.

In the use of both embodiments of the trolling sinker of the present invention, after the fish line has been secured to the means 11 and the lure or bait and hook to the means 13, the sinker is placed in the water and floats with the rod extending downwardly. As the sinker is moved forward, a force is created by the relative movement between the water and the surface of the fin which overcomes the buoyancy of the body to drive the sinker downwardly. Such downward movement continues until the end of the rod 19 engages the bottom, thereby spacing the body the vertical height of the rod above the bottom and as the forward or trolling movement continues, the end of the rod is kept in engagement with the bottom. Naturally if the forward movement of the sinker is decreased below a minimum speed, the fin does not create sufficient downward force to overcome the buoyancy of the body and hence the sinker will rise. The minimum speed may be altered to that desired by changing the fin area, its angle of inclination and the amount of buoyancy of the body.

It will be appreciated that the sinker of the present invention, when drawn through the water, is maintained substantially horizontal, as shown in FIG. 1, so that the body is maintained the selected height above the bottom. This is effected by the eye 11 being spaced substantially forward from the fin 21 (or 26) and the rod 19.

It will further be appreciated that the rod 19 is slender and of substantially constant diameter, thereby minimizing any tendency for it to snag on rocks or other objects on the bottom. Moreover, the rod 19, by being formed of non-buoyant material acts as weighted keel on the buoyant body and to thereby prevent rolling or substantial keeling of the sinker, even when the sinker is drawn in a curving path.

While in both embodiments, the bar 17 and rod 19 have been shown as being formed from a unitary length of wire with the means 11 and the eye 18 being integral, it is within the present invention to make them separate and attach them as separate pieces to the body.

It will accordingly be appreciated that there has been disclosed two embodiments of a trolling sinker that is employed to space a lure or bait and hook a predetermined height above the bottom of the water when used. The height is maintained even if the sinker is drawn in a curving path. The sinker by being relatively light and having only the end of a thin rod engaging the bottom has little tendency to snag. Moreover, this structure of a trolling sinker produces a substantially constant pull on the line even when encountering rocks or objects on the bottom, thereby increasing the ability of a fisherman to discern if a fish has accepted the hook.

Variations and modifications may be made within the scope of the claim and portions of the improvements may be used without others.

I claim:

A trolling sinker comprising an elongate buoyant body, first means secured to the front end of said body adapted to be secured to a fishing line, second means secured to the rear end of said body adapted to be secured to a lure and hook line, fin means secured at the rear end of the body comprising a plate inclined upwardly and rearwardly with respect to the body and a thin elongate rod formed from sinkable material having its top end secured to the body at the rear end thereof to depend downwardly therefrom, said rod being of sufficient length and weight and the body having such buoyancy that when the sinker is not being pulled through water the body will float to the surface with the rod being maintained in its depending position and when drawn through the water above a minimum speed the fin means overcomes the buoyancy of the body to effect sinking of the sinker to a height above the water bottom determined by the length of said rod as it depends from the body.

References Cited in the file of this patent
UNITED STATES PATENTS

| | | |
|---|---|---|
| 1,232,211 | Burkman | July 3, 1917 |
| 1,875,122 | Olson | Aug. 30, 1932 |
| 2,545,185 | Winston | Mar. 13, 1957 |
| 2,924,907 | Hamilton | Feb. 16, 1960 |
| 2,940,207 | Scott | June 14, 1960 |
| 2,977,709 | Keiter | Apr. 4, 1961 |